UNITED STATES PATENT OFFICE.

JOSEPH H. AMIES, OF PHILADELPHIA, PENNSYLVANIA.

MANUFACTURE OF BRICK.

SPECIFICATION forming part of Letters Patent No. 665,860, dated January 15, 1901.

Application filed October 30, 1899. Serial No. 735,294. (No specimens.)

*To all whom it may concern:*

Be it known that I, JOSEPH H. AMIES, a citizen of the United States, residing at Philadelphia, in the county of Philadelphia and State of Pennsylvania, have invented new and useful Improvements in the Manufacture of Brick, of which the following is a specification.

My invention relates to a composition of matter for the manufacture of bricks, fence-posts, roofing, steps, artificial stone, plaster, partition-walls, flooring, paving, and for similar uses; and the objects sought to be accomplished are to produce a composition which, if used in the manufacture of bricks and for similar purposes, will not require kiln-drying or burning, and which may be made in part of the soil taken from excavations where buildings are to be erected, and which may be made without the use of extensive machinery and by a short process which will produce good and quick results. With the brick in common use it is found impracticable to make them moisture-proof, owing to their porous character. Brick made in accordance with my invention are hard and solid and will take a thin coating of moisture-proofing compound or oil without undue absorption.

My composition is made up as follows: I take common raw clay and add sufficient water to produce a soft plastic mass. I do not grind or work the clay, as I find this to be unnecessary to produce the desired result. When the clay and water have been well mixed, I then add thereto a quantity of fibers—such as grass, leaves, sawdust, shavings, hay, paper, or any cheap or refuse fibrous materials. When these materials have been properly mixed together, I add to the mass a quantity of plaster-of-paris of the most inexpensive grade or kind. The addition of plaster-of-paris has been found by experiment to neutralize the acids in the clay and to render the material very hard when dry. When this mass has been prepared, I mix a quantity of thin or damp mortar, made of sharp sand, gravel, grit, and cement. To make this mortar properly, the sand, grit, and cement are well mixed dry and then wet or made merely damp, so it will mold readily in coarse granular lumps.

In adding the mortar to the mass of clay and fibers it is to be preferred that the two masses should be kept separated or independent until just prior to the time when the materials are to be placed in the dies, sufficient time only being allowed to permit the mortar to permeate and work through the clay and fibers before molding the brick. If a machine is used in making the brick, the two masses may be united at the desired time before the material is passed to the dies.

Instead of clay in the first mass I may use common ashes or a mixture of clay and ashes or a mixture of sand and gravel, especially when I wish to produce a high class of brick. The amount of cement to be used may be varied according to the different ingredients used.

When the bricks are to be made moisture-proof, I coat or dip them in an ordinary moisture-proofing compound or oil, varnish, or paint.

Brick made in the manner described and of the materials referred to will take a thin and smooth coat of impervious compound and will not absorb an undue quantity of the liquid.

It is a well-known fact that ordinary brick will not take a coat of the common moisture-proofing compound, owing to the porous character of such brick. It is also well known that cement will not intimately mix with clay, owing to the acids in the clay; but I have found that the addition of a small quantity of plaster-of-paris neutralizes the action of the acids and aids in producing a desirable material for making a substantial hard composition for the purposes described.

I may vary the proportions of the various ingredients referred to herein to a considerable extent when it is desired to use the composition for different purposes.

The following proportions produce good results: clay or ashes, gravel, or sand and water, one thousand pounds; fibrous materials—such as grass, paper, &c.—one hundred pounds; plaster-of-paris, one hundred pounds; mortar—sand, gravel, and cement—five hundred pounds.

Having thus fully described my invention, what I claim is—

A composition of matter consisting of raw clay, ashes, water, fibrous material, plaster-of-paris, sand, and cement in substantially the proportions set forth.

In testimony whereof I have hereunto set my hand in presence of two subscribing witnesses.

JOSEPH H. AMIES.

Witnesses:
   JAMES P. PETIT,
   CHAS. J. FLECK.

---

Brit.patent,1205 of 1870,Class.106.Compositions;
Tures,223,018,Dec.30,1879, " " "
Riley,108,055,Oct.4,1870,Plas.Fibre.
Bare et al.,302,646,July 29,1884,Comp.
Miller,283,138, Aug.14,1888,Boiler Coverings
Ashcroft,59,338,Nov.6,1866, " " "